(12) United States Patent
Chuaypradit et al.

(10) Patent No.: US 9,814,982 B2
(45) Date of Patent: Nov. 14, 2017

(54) MITIGATING COLLISIONS IN A PHYSICAL SPACE DURING GAMING

(71) Applicant: GLOBALFOUNDRIES INC., Grand Cayman (KY)

(72) Inventors: Prach Jerry Chuaypradit, Monroe, NY (US); Wendy Chong, Carmel, NY (US); Ronald C. Geiger, Jr., Lagrangeville, NY (US); Janani Janakiraman, Austin, TX (US); Joefon Jann, Ossining, NY (US); Jenny S. Li, Danbury, CT (US); Anuradha Rao, Hopewell Junction, NY (US); Tai-chi Su, Woodbury, CT (US); Singpui Zee, West Nyack, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 197 days.

(21) Appl. No.: 14/630,774

(22) Filed: Feb. 25, 2015

(65) Prior Publication Data

US 2016/0243443 A1   Aug. 25, 2016

(51) Int. Cl.
  *A63F 9/24*        (2006.01)
  *A63F 13/577*    (2014.01)
  *A63F 13/537*    (2014.01)
  *A63F 13/65*      (2014.01)
  *A63F 13/58*      (2014.01)
  (Continued)

(52) U.S. Cl.
  CPC .......... *A63F 13/577* (2014.09); *A63F 13/537* (2014.09); *A63F 13/65* (2014.09); *A63F 13/428* (2014.09); *A63F 13/58* (2014.09); *A63F 13/792* (2014.09); *A63F 2300/305* (2013.01)

(58) Field of Classification Search
  None
  See application file for complete search history.

(56) References Cited

U.S. PATENT DOCUMENTS 8,333,661 B2   12/2012  Ng
8,657,682 B2   2/2014   Lai
9,266,022 B1 *  2/2016   Pasqualone ............. A63F 13/10
(Continued)

FOREIGN PATENT DOCUMENTS

WO    2010031041 A2    3/2010

OTHER PUBLICATIONS

Hamasaki et al; Prediction of Human's Movement for Collision Avoidance of Mobile Robot.

*Primary Examiner* — Jason Yen
(74) *Attorney, Agent, or Firm* — Gibb & Riley, LLC; Anthony J. Canale (57) ABSTRACT

To mitigate collisions in a physical space during gaming, a set of physical objects and a user situated in the 3D space are mapped to determine a spacing between an object in the set of physical objects and the user, where the user moves in the 3D space to cause a motion in a virtual environment of a game. A prediction is computed that the user will make a motion in the 3D space during the gaming. For the motion in the 3D space, a motion trajectory of the user is computed using a measurement parameter corresponding to the user stored in a user profile. A detection is made that the motion trajectory of the user violates a spacing threshold between the user and the object, and the user is alerted about a risk of collision between the user and the object in the 3D space.

17 Claims, 6 Drawing Sheets

(51) Int. Cl.
  *A63F 13/792*   (2014.01)
  *A63F 13/428*   (2014.01)

(56) References Cited

U.S. PATENT DOCUMENTS

| | | | |
|---|---|---|---|
| 2002/0024521 A1* | 2/2002 | Goden | A63F 13/10 |
| | | | 345/474 |
| 2005/0059489 A1 | 3/2005 | Kim | |
| 2011/0068937 A1 | 3/2011 | Lai | |
| 2011/0230263 A1* | 9/2011 | Ng | A63F 13/213 |
| | | | 463/31 |
| 2013/0005467 A1* | 1/2013 | Kim | A63F 13/06 |
| | | | 463/36 |
| 2013/0196759 A1* | 8/2013 | Kim | A63F 13/06 |
| | | | 463/31 |
| 2013/0197887 A1 | 8/2013 | Raschke et al. | |
| 2013/0225296 A1* | 8/2013 | Kim | A63F 13/04 |
| | | | 463/37 |
| 2014/0211990 A1* | 7/2014 | Kim | A63F 13/06 |
| | | | 382/103 |
| 2015/0309583 A1* | 10/2015 | Lim | G06F 3/017 |
| | | | 345/156 |

* cited by examiner

MITIGATING COLLISIONS IN A PHYSICAL SPACE DURING GAMING

TECHNICAL FIELD

The present invention relates generally to a method, system, and computer program product for improving safety with electronic gaming devices. More particularly, the present invention relates to a method, system, and computer program product for mitigating collisions in a physical space during gaming.

BACKGROUND

A gaming device includes a data processing system and software that creates a virtual environment using which a user can perform physical motions or movements to simulate a game. Presently, many gaming devices in the form of gaming consoles are available, using which users can play simulated baseball, golf, bowling, skiing, tennis, boxing, and numerous other games.

Many gaming devices incorporate aspects of the real world games in their virtual environments in order to provide a life-like gaming experience to the users. For example, in the virtual environments of many games that are playable on such gaming devices, the graphics are becoming increasingly realistic, including three dimensional rendering of objects, structures, places, and users/actors. Images of users and objects in such games also move with increasingly smooth motions that resemble the fluidity of the corresponding motions of users and objects in the real world.

Such a virtual environment is also commonly known as a virtual world, or a virtual space. A virtual environment is an electronically simulated environment in which virtual creatures move about and perform actions similar to how real creatures would in a comparable real world environment.

Users playing in virtual environments use virtual equipment to perform their gaming movements. For example, a user playing golf in a virtual environment performs a golf swing motion with an imaginary club and an imaginary ball in the user's living room. A gaming device translates the user's golf swing motion in the user's living room into a corresponding motion performed by a representation of the user on a virtual golf course in the virtual environment. The representation of the user is depicted to hold a graphical club and the golf swing motion of the representation of the user causes the graphical club to strike a graphical ball on the virtual golf course.

Many games can be played as single-player games, multi-player games, or as a choice of either single or multiple players in such virtual environments. As described above, a user performs physical motions in the three-dimensional (3D) space of the real or physical world to simulate a motion in the virtual environment of the game. It is easy for a user to get engrossed in the virtual environment of the game and lose track of the user's actual physical location in the 3D space. When a user moves about and performs game-related motions in the 3D space, a risk exists that the user may collide with a physical object located in that 3D space or with another user present in the same 3D space.

SUMMARY

The illustrative embodiments provide a method, system, and computer program product for mitigating collisions in a physical space during gaming. An embodiment includes a method for mitigating collisions in a physical three dimensional (3D) space during gaming. The embodiment maps a set of physical objects and a user situated in the 3D space to determine a spacing between an object in the set of physical objects and the user, where the user moves in the 3D space to cause a motion in a virtual environment of a game. The embodiment predicts that the user will make a motion in the 3D space during the gaming. The embodiment computes, using a processor and a memory, for the motion in the 3D space, a motion trajectory of the user, where the computing uses a measurement parameter corresponding to the user stored in a user profile. The embodiment detects that the motion trajectory of the user violates a spacing threshold between the user and the object. The embodiment alerts, responsive to the detecting, the user about a risk of collision between the user and the object in the 3D space.

Another embodiment includes a computer readable article of manufacture tangibly embodying a computer readable instructions which, when executed, cause a computer to carry out steps of a method for mitigating collisions in a physical three dimensional (3D) space during gaming.

Another embodiment includes a data processing system for mitigating collisions in a physical three dimensional (3D) space during gaming.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Within the scope of the illustrative embodiments, a collision is a present or imminent proximity of a user with another user or of a user with a physical object by less than a threshold distance. An actual impact of a user with another user or object in a 3D space is an example of a collision. A user coming within a threshold distance of another user or object in the 3D space is another example of a collision.

A collision is imminent or possible when an actual impact or a breach of the threshold distance by the user is likely in a predicted trajectory of a present or anticipated motion of the user. For example, assume that two users are occupying a 3D space to play golf using a gaming device. A right-handed user, who is about to hit a stroke in the game, will be required to first swing the user's arms to the right of the user's torso, then come to a momentary stop when the hands approximately reach the height of the user's eyes, and finally swing the arms all the way around to the left of the user's torso, coming to a stop when the hands approximately reach the height of the user's eyes.

Further assume in this example that another user is standing 3 feet behind the left flank of the right-handed user. A threshold distance for the right-handed user is set to 2.5 feet. Normally, when the right-handed user is not moving in the 3D space, the separation between the two users exceeds the threshold. However, if the right-handed user were to swing as described in this example, there exists a possibility that the right-handed user will collide with the other user at the end of the swing.

Similarly, if a single user were playing tennis using a gaming device, the movements of the user in the 3D space can actually or potentially take the user to less than a threshold distance of a table that is also present in the 3D space. In other words, there is a chance that due to the user's motions in the 3D space to cause corresponding motions in the virtual environments, the user may collide with the table or come dangerously close to it.

Presently available gaming devices do provide warnings to clear sufficient space around a user before playing a game using the gaming device. However, the presently available gaming devices are not able to detect such collisions or possibilities of collisions in the actual 3D environment as the game progresses and as the user makes motions and movements in the 3D space according to the progression of the game.

The illustrative embodiments used to describe the invention generally address and solve the above-described problems and other problems related to the safety of the users of gaming devices. The illustrative embodiments provide a method, system, and computer program product for mitigating collisions in a physical space during gaming.

An embodiment can be implemented as software instructions of an application. The application can be configured to execute locally on a gaming device or be usable by the gaming device over a data network.

An embodiment maps a 3D space where a user will make the motions and movements to play a game in a virtual environment presented by the gaming device. For example, the embodiment uses a camera or other imaging device associated with the gaming device to capture and process an image of the 3D space.

The processing of the 3D space establishes one or more distances in the 3D space. For example, using image recognition for the processing, an embodiment computes a distance between a user's initial position in the 3D space and an edge of a table, a wall, or another object present in the 3D space. As another example, such as when multiple users will be playing, an embodiment computes a distance between users' initial positions in the 3D space. Generally, any number of users and objects can be present in a 3D space, and any number of distances therebetween can be computed using an embodiment in a similar manner.

An embodiment also configures a profile for each user. For example, one embodiment stores in the user's profile, the user's height, length of arms, spacing between the feet in a stance, reach distance using a particular limb, a right-handed or left-handed or ambidextrous preference of the user, an age of the user, and the like.

An embodiment also configures in a user's profile, one or more biometric parameters for the user, whose use is described in this disclosure. For example, the embodiment records a normal value or range of body temperature, normal value or range of moisture content of the skin—e.g., in the palms used to hold a controller of the gaming device, a normal value or range of the user's blood pressure, normal value or range of heart rate, and the like.

Without implying any limitation thereto on the illustrative embodiments some example circumstances are described herein to demonstrate how an embodiment uses one or more biometric parameters of a user. For example, when a user has been moving to play a game in the virtual environment for a length of time, the user's heart rate, blood pressure, body temperature and perspiration, or some combination thereof, are expected to rise. The longer the period of the play, the more fatigued the user is expected to become. Suppose that a rule is configured to correlate the possibility of a collision with fatigue, such that the possibility of a collision rises with increasing fatigue.

Using such a rule, an embodiment can change or adjust the advance warning period for a collision. For example, the embodiment presents a notification of an impending collision to a user by presenting a visual cue on a display, a sound alert, or a tactile feedback at a controller. As an example, during the beginning 15 minutes of play time or the first 3 stages of the game, the expectation is that the user is unlikely to be fatigued. Thus, for a particular distance threshold, during the non-fatigued period or stages, the embodiment presents such notifications when the user is 1 foot away from breaching the threshold or 2 seconds away from breaching the threshold, or the like.

As the user becomes progressively more tired, the embodiment computes the user's state of fatigue using the user's biometric parameters in combination with the elapsed duration of the play, and other factors. Accordingly, the embodiment produces the warnings sooner or farther from the imminent breach of the threshold to allow longer response time from the user.

Similarly, many other rules can be configured to enable an embodiment to adjust the presentation, timing, or both of collision notifications. For example, a user's heart rate may be raised not due to fatigue but due to nervousness, e.g., when playing against a high ranking player, when the user is new at the game, or when selecting a high game level at which to begin playing. As another example, the user may be perspiring more than normal not because of fatigue but because the ambient temperature in the 3D space may be higher than normal as measured by an embodiment.

These examples of the rules and the example use of the biometrics are not intended to be limiting. From this disclosure, those of ordinary skill in the art will be able to conceive many other similarly purposed rules and uses of the user's biometrics, and the same are contemplated within the scope of the illustrative embodiments.

A game can have one or more associated motion profiles. A motion profile provides a trajectory, velocity, and force of a motion used in the game. A motion profile also provides game situations where such motion is used.

Using a motion profile, in combination with the user's profile and one or more rules described herein, and based on the user's present position in the game and in the 3D space, an embodiment determines whether the impending action in the game involves a motion that will create a risk of a collision for the user in a single-player game, or for any of the users in a multi-player game. For example, in a multi-player situation, the two or more users have their own profiles including their biometric measurements. The movements of different users and the spacing between them can affect the collision chances for a user. For example user 1 may be calm, but if user 2 is making risky moves, which may trigger a collision with user 1, an embodiment can warn user 1 to be careful about a collision with user 2.

For example, the embodiment computes a movement trajectory of a motion, made by the user, from the user's present position, using, e.g., the user's arm length from the user's profile, and a distance threshold from a physical object located in the 3D space. If the movement trajectory breaches the threshold distance, then a risk or possibility exists that the user will collide with the physical object when the user makes that movement during the play. If a space boundary defined by the threshold around a physical object or the user will be violated by the movement, an embodiment presents a notification to the user.

An embodiment also logs, for historical analytics, instances of possible collisions. An example entry in such a log can include any data sufficient to determine the circumstances of a play in a game, the biometric or other state of a user, the characteristics of the user's movements, the ambient circumstances in a 3D space, the presence of other stationary or movable objects or users in the 3D space, or some combination of these and other data, that gave rise to the possibility of the collision.

If the collision actually occurs despite the notification, another log entry similarly records the circumstances at the time of the collision, the force of the collision, the severity of the collision, the frequency or count of the collision, and the like. Such collision logs are used by an embodiment locally at the gaming device, as well as transmitted for remote use.

As an example, one embodiment analyzes the logs to determine whether the user avoided a collision about which the user was notified. If the user avoids the collisions that an embodiment warns of, the embodiment rewards the user. If the user ignores the notification and the collision occurs, the embodiment penalizes the user. Some non-limiting examples of rewards and penalties for this purpose include adding or removing points in an account of a user, adding or removing a life or amenity in the game, enabling or disabling a feature of the game, enabling or disabling an opportunity in the game, and many others.

One embodiment further transmits the log entries for aggregation, such as by a manufacturer of the game. For example, such logs are usable by the manufacturer to determine whether a play in the game creates exceptionally high collision rates, and to remedy the play by a patch or a bug fix.

An embodiment further grades the user as a safe player, an unsafe player, and any number of grades therebetween. One embodiment uses such grades, or other historical analysis of the logs, to speed up or slow down a game as another method of notifying the user, or rewarding or penalizing the user.

Another embodiment projects an image of the 3D space within the game to show the user relative to other objects in the 3D space. Such projections can serve as another mechanism to notify a user of a risk of collision, to draw the user's attention to the user's surroundings, or some combination of these and other purposes.

A method of an embodiment described herein, when implemented to execute on a device or data processing system, comprises substantial advancement of the functionality of that device or data processing system in mitigating collisions in a physical space during gaming. For example, the prior-art gaming devices do not actively monitor the user and the 3D space through the gaming activity for possibilities of collisions. In contrast, an embodiment actively monitor the user and the 3D space through the gaming activity for possibilities of collisions, warns the user of possibilities of collisions, tracks a user's collision avoidance actions, and encourages safe play through a system of rewards and penalties. Such manner of making a 3D space safe for gaming using a gaming device is unavailable in presently available devices or data processing systems. Thus, a substantial advancement of such devices or data processing systems by executing a method of an embodiment allows for safer activities in the real physical 3D space while playing with the gaming devices.

The illustrative embodiments are described with respect to certain games, environments, objects, biometrics, thresholds, rules, parameters, rewards, penalties, log data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures thereof, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
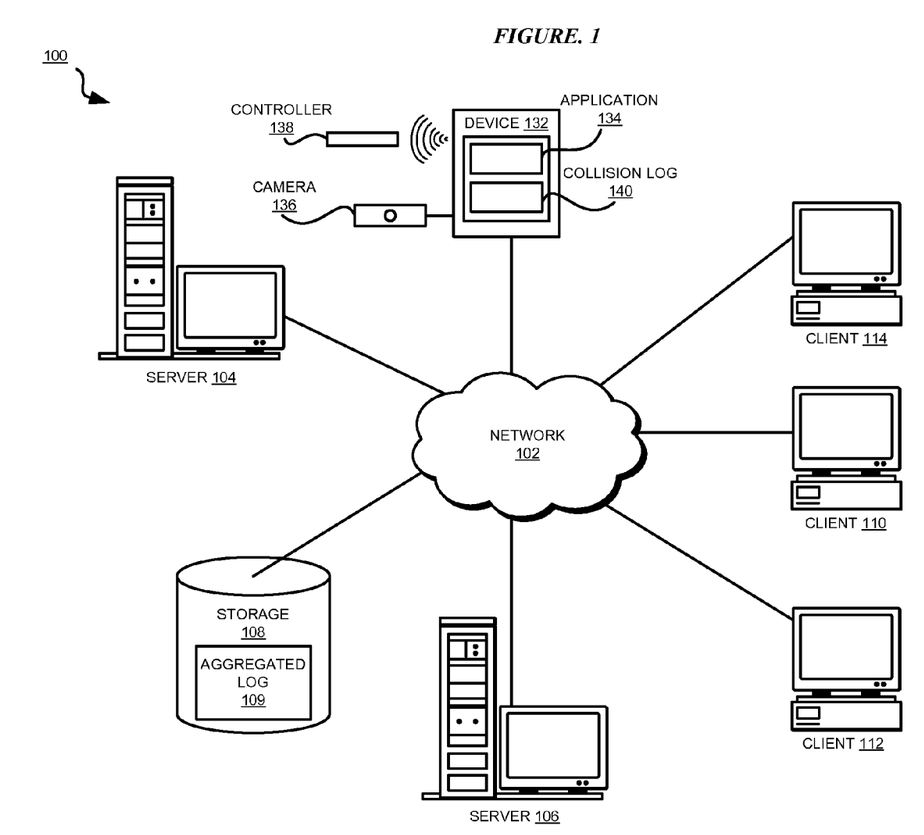
FIG. 1 depicts a block diagram of a network of data processing systems in which illustrative embodiments may be implemented.
Figure 2:
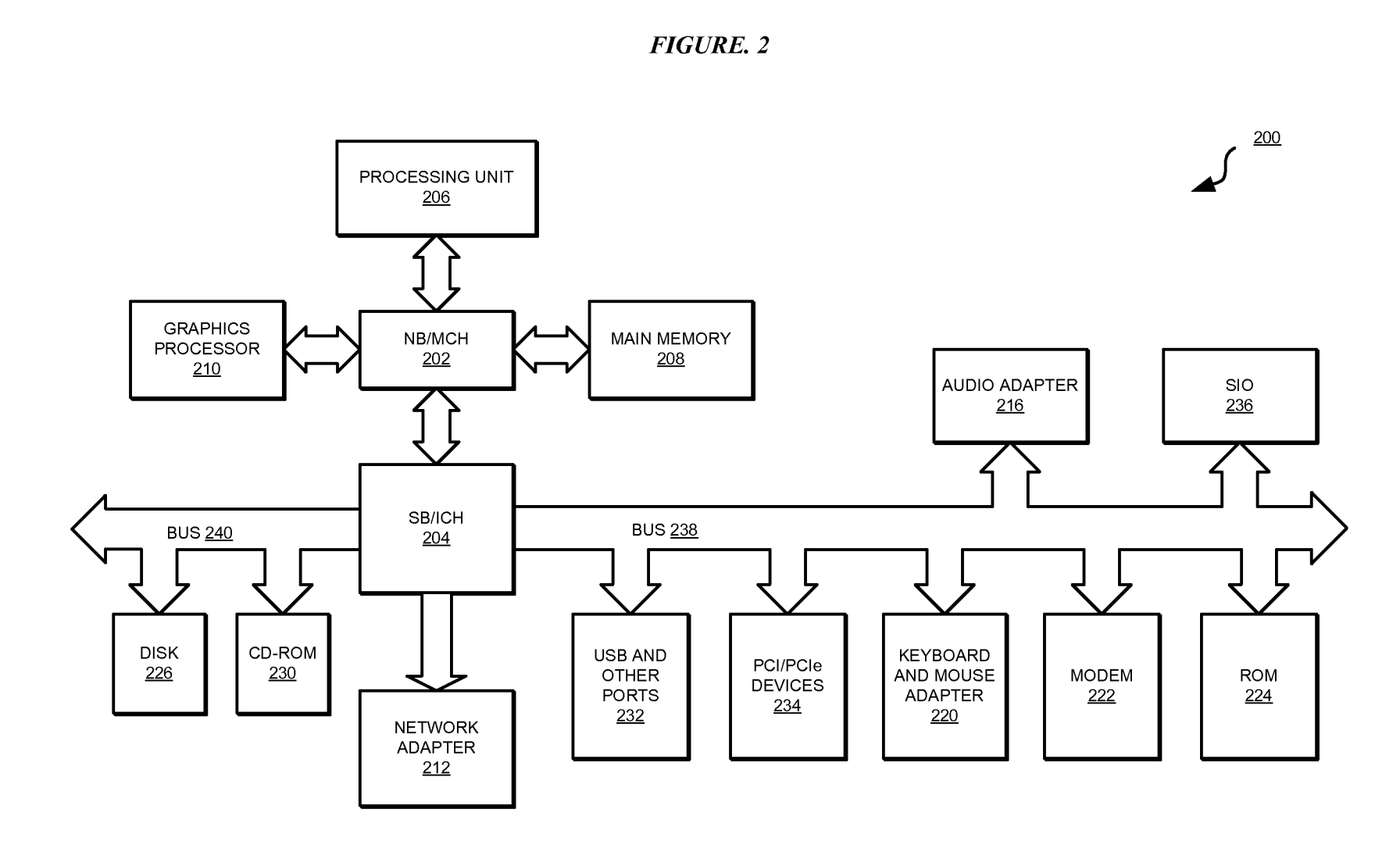
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 134 executes in gaming device 132, or remotely from gaming device 132 while being reachable from gaming device 132. Application 134 implements an embodiment described herein. Camera 136 is an example device to capture images of the 3D space in which a user performs motions to play a game using gaming device 132. Camera 136 captures such images as the user moves during the game, so that application 134 can process the images in the manner described herein. Optional controller 138 is a device that the user can hold to enable gaming device 132 to track the user's motions. Collision log 140 is a log record maintained for use by application 134 at gaming device 132, as described herein. In one embodiment, collision log 140 may be stored remotely from device 132. Application 134 transmits all or a part of collision log 140 to form aggregated log 109. Aggregated log 109 is usable by a manufacturer of gaming device 132 or of a game application (not shown) executed thereon.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also be viewed as employing a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive or solid-state drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1 are located on storage devices, such as hard disk drive 226 or a solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
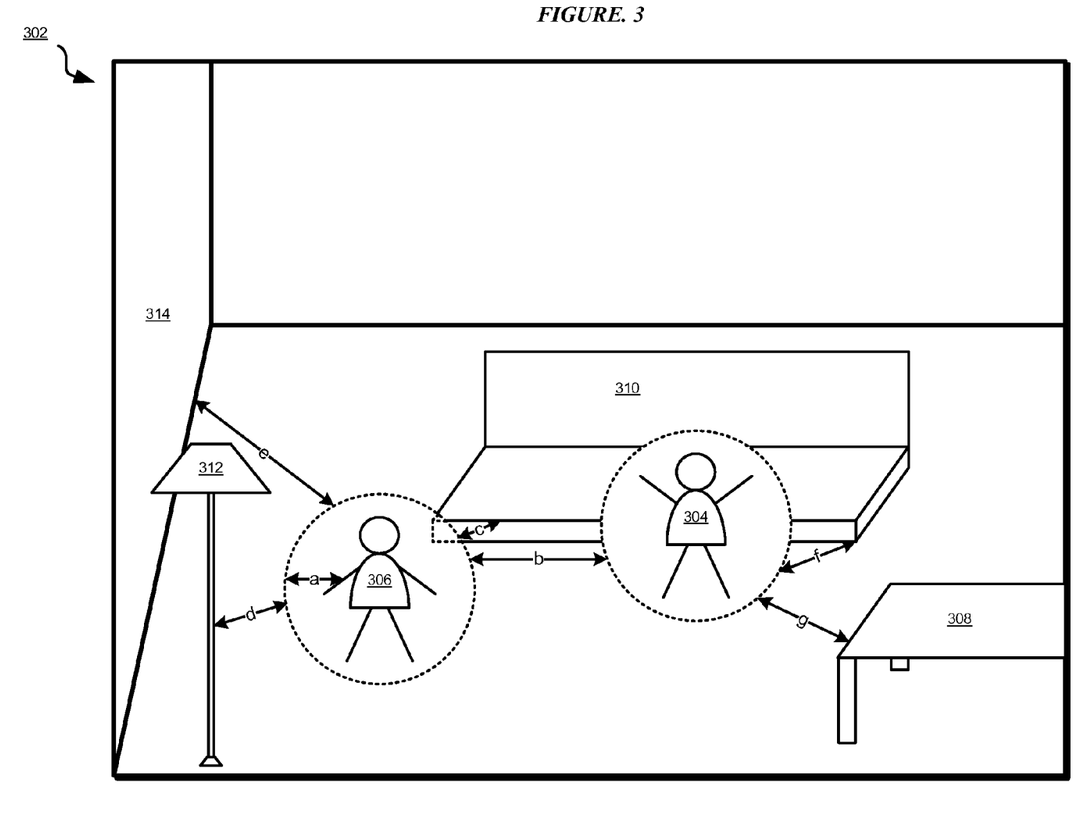
FIG. 3 depicts a view of an example 3D space, which is captured and processed in accordance with an illustrative embodiment.

With reference to FIG. 3, this figure depicts a view of an example 3D space, which is captured and processed in accordance with an illustrative embodiment. Image 302 is captured using an imaging device, e.g., camera 136 in FIG. 1. Image 302 can be captured for analysis at the beginning of a game or anytime during the game for ongoing assessment of risk of collisions.

Image 302 includes representations of example users 304 and 306 positioned in a room. Table 308, couch 310, and lamp 312 are some examples representations of physical objects in the room. Wall 314 limits the 3D space of the room in one direction.

A space boundary at threshold distance "a" from user 306 is depicted as an example. Distance "a" is one threshold distance, breaching which a collision would be imminent with user 306. For example, if the movements of user 306 caused lamp 312 to come closer than distance "a" to user 306, a collision between user 306 and lamp 312 would be a possibility.

User 304 also has a similar space boundary defined about user 304, using the same or a different threshold distance as user 306. A physical object can also have a threshold distance based space boundary defined about the object (not shown).

Distance "b" is an example threshold distance between the space boundaries of users 304 and 306. Any number same or different threshold distances can be defined between space boundaries of users, physical objects, or a combination thereof.

An object need not necessarily have a space boundary. In other words, a space boundary may be at zero distance from the user or object. For example, a space boundary of couch 310 is located at an edge of couch 310. Threshold distance "c" is an example threshold distance between the space boundary of user 306 and couch 310. Similarly, threshold distance "d" is an example threshold distance between the space boundary of user 306 and lamp 312; and threshold distance "e" is an example threshold distance between the space boundary of user 306 and wall 314. Likewise, threshold distance "f" is an example threshold distance between the space boundary of user 304 and an edge of couch 310;

and threshold distance "g" is an example threshold distance between the space boundary of user 304 and an edge of table 308.

An embodiment, such as one implemented in application 134 in FIG. 1, processes image 302 to compute or otherwise establish a set of threshold distances in this manner. Thereafter, the application captures more instances of image 302 with users 304 and 306 moving in the 3D space of the room in the image. Although all physical objects depicted in image 302 are stationary, movable inanimate objects can similarly be present in the 3D space of one or more instances of image 302.

The application uses such ongoing image instances to determine whether a collision between users 304 and 306, a collision between user 304 and table 308, a collision between objects, or one or more other such collisions are possible, based partially on the positions of the users and the objects at a given time.

Figure 4:
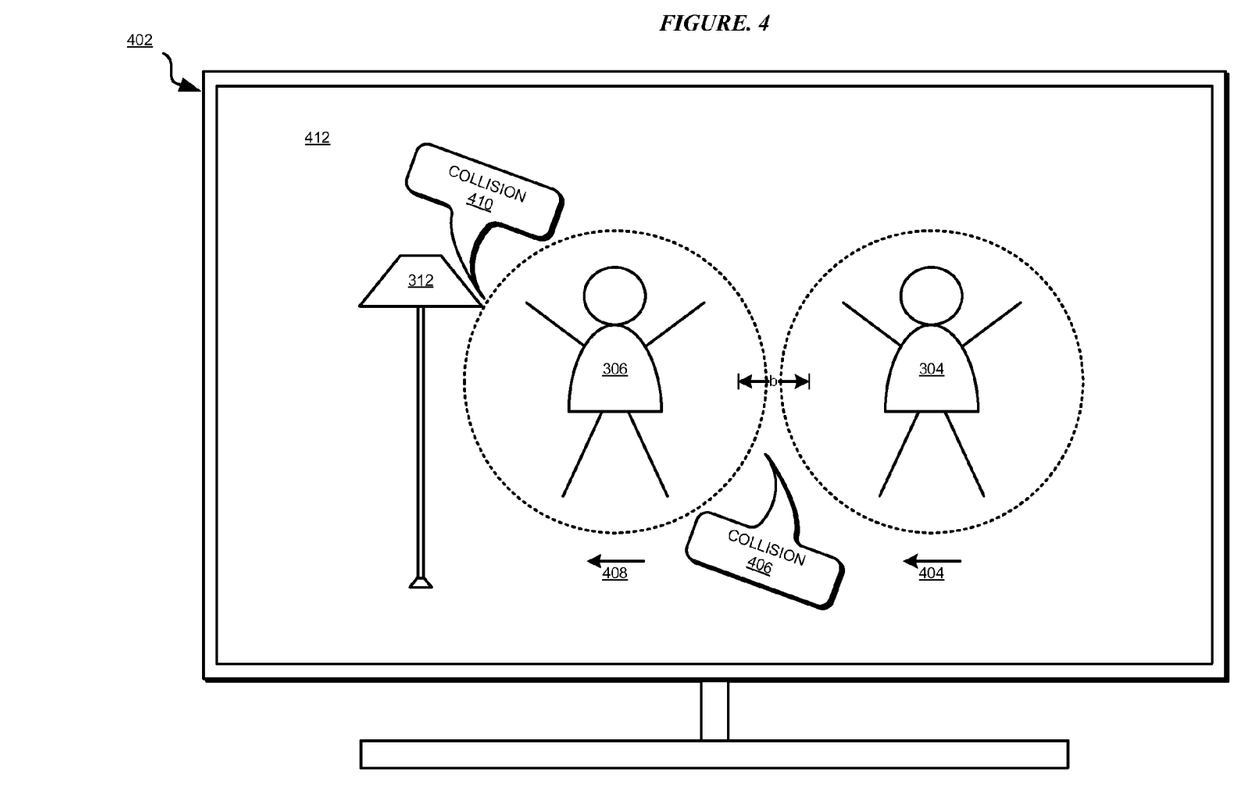
FIG. 4 depicts example notifications of possible collisions in accordance with an illustrative embodiment.

With reference to FIG. 4, this figure depicts example notifications of possible collisions in accordance with an illustrative embodiment. Display 402 is associated with a gaming device, such as with gaming device 132 in FIG. 1.

An application, such as application 134 in FIG. 1, detects that a threshold separation distance between two space boundaries has been violated. For example, as shown, the space boundaries of users 304 and 306 are shown closer than threshold distance "b". A collision has not yet occurred between users 304 and 306, but is possible if user 304 continues to move in direction 404 towards user 306. The application presents notification 406 to notify the actual human users corresponding to user representations 304 and 306 about the impending collision between the human users in the 3D space.

As another example, the space boundary of user 306 is closer than threshold distance "d" from object 312. A collision has not yet occurred between user 306 and object 312, but is possible if user 306 continues to move in direction 408 towards object 312. The application presents notification 410 to notify the actual human user corresponding to user representation 306 about the impending collision between the human user and the lamp in the 3D space.

According to one embodiment, the application overlays or projects image 412 onto a game presentation (not shown) on display 402. The application presents notifications 406 and 410 as visual notifications. Such overlays and visual notifications may be in supplemented or substituted by audible notifications, tactile notifications, or some combination thereof.

Figure 5:
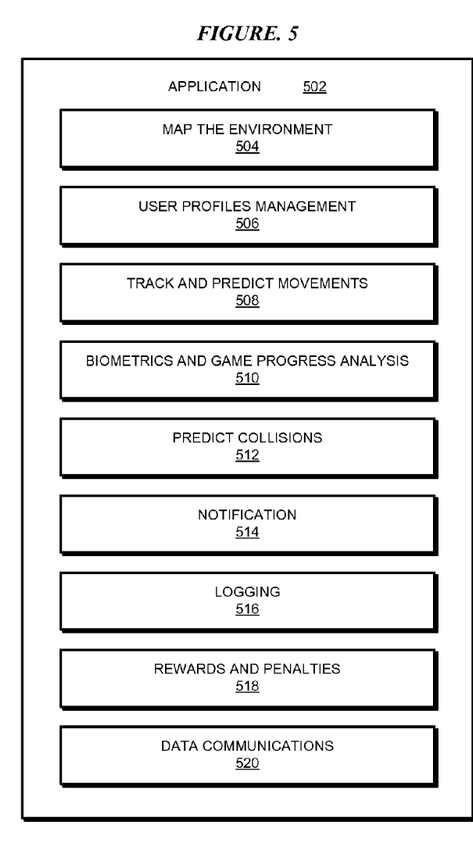
FIG. 5 depicts a block diagram of an example configuration of an application for mitigating collisions in a physical space during gaming in accordance with an illustrative embodiment.

With reference to FIG. 5, this figure depicts a block diagram of an example configuration of an application for mitigating collisions in a physical space during gaming in accordance with an illustrative embodiment. Application 502 is an example of application 134 in FIG. 1.

Component 504 maps the game environment, i.e., the 3D space in which one or more users will operate a game on a gaming device. Component 504 receives one or more images, such as images 302 in FIG. 3 and image 412 in FIG. 4, from an imaging device, such as camera 136. Component 504 computes the distances between the users and the objects present in an image. The computed distances can be used to establish threshold distances, as in FIG. 3, or to predict collisions in the 3D space, as in FIG. 4.

Component 506 manages one or more user profiles. For example, component 506 receives one or more inputs from a user specifying one or more user-specific parameters, biometric parameters, or some combination thereof, as described herein. These parameters are usable to establish threshold distances, predict collisions, adjust notification timing or method, and other functions that will be apparent from this disclosure to those of ordinary skill in the art, and which are contemplated within the scope of the illustrative embodiments.

Component 508 uses one or more motion profiles of a game, a user parameter in a user profile, a present position of a user from an image analysis, threshold distances computed or stored previously, or a combination thereof, to track and predict the user's movements in a given 3D space. Component 510 uses a state reached in the game, a biometric parameter value collected from the user, a user parameter in a user profile, or some combination thereof to determine when and how to notify the user about possible collisions. Using these inputs, component 510 also computes whether a user is more likely to continue on a collision trajectory and actually cause a collision, such as due to fatigue.

Component 512 uses the computations of component 504, a profile parameter from component 506, a computation of component 508, a computation of component 510, or a combination thereof, to predict a collision. Component 514 notifies a user about the predicted collision.

Component 516 logs the predicted collision events, actual collision events, or both. Some example data that is logged as a part of the logging performed by component 516 is described in this disclosure.

Component 518 associates rewards with collision avoidance, and penalties with collision occurrence. Component 520 communicates with an external data processing system, such as repository 108 in FIG. 1 used by a manufacturer, to provide all or part of the log data collected by component 516.

Figure 6:
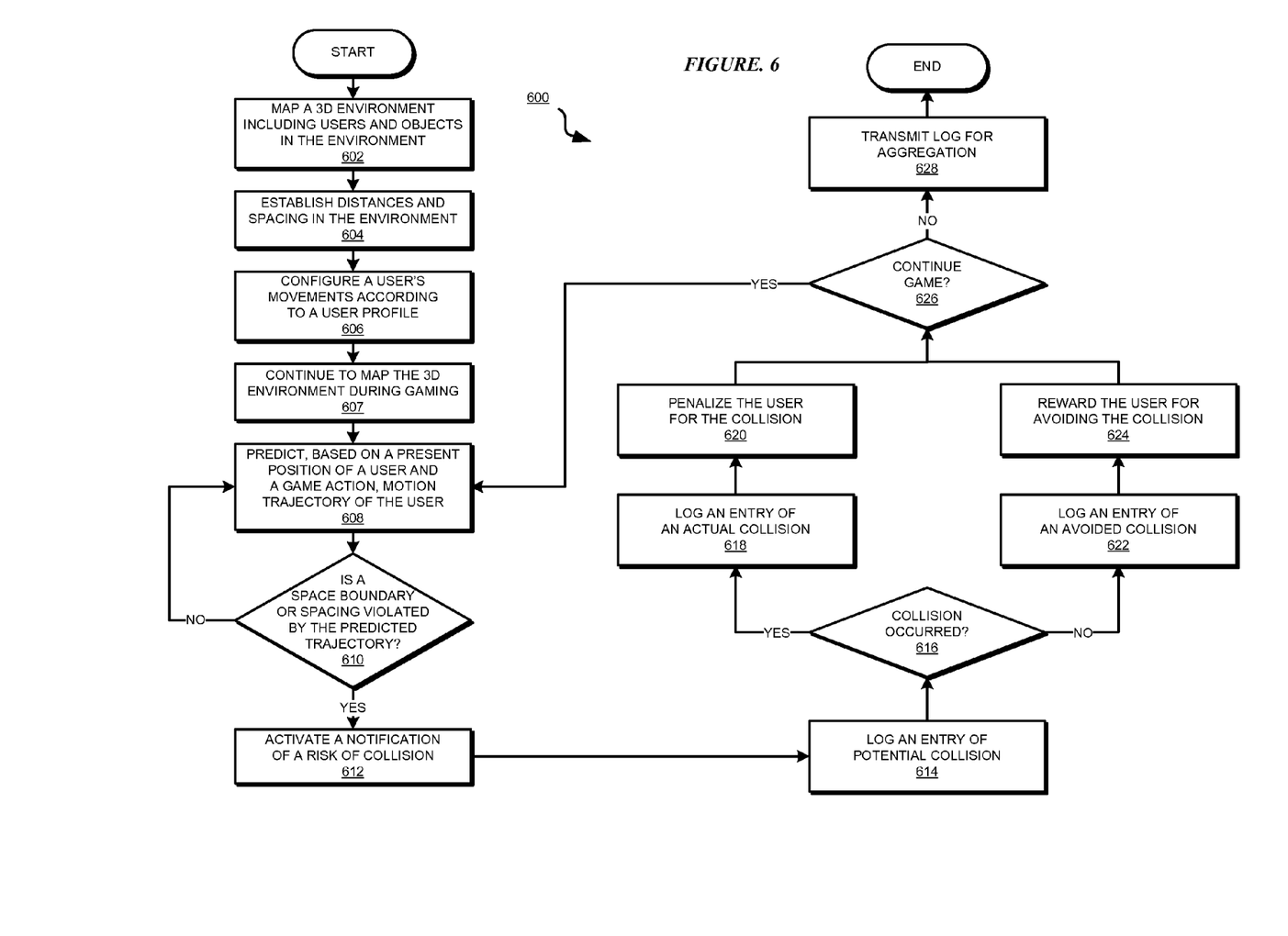
FIG. 6 depicts a flowchart of an example process for mitigating collisions in a physical space during gaming in accordance with an illustrative embodiment.

With reference to FIG. 6, this figure depicts a flowchart of an example process for mitigating collisions in a physical space during gaming in accordance with an illustrative embodiment. Process 600 can be implemented in application 502 in FIG. 5.

The application maps a 3D environment, such as a 3D space, including the users and objects in the environment (block 602). The application establishes distances and spacing thresholds in the environment (block 604). The application configures a user's movements according to a user profile, such as a distance of an arm-swing, a size of a step, a span of a arm-sweep, and the like, according to user parameters in the user profile, such as the length of an arm or height (block 606).

The application continues to map the 3D environment during a gaming activity, e.g., as the game progresses and the user moves in the 3D environment (block 607). The application predicts a motion trajectory of the user based on a present position of the user, an upcoming action or motion in the game, and a parameter in the user's profile (block 608).

The application determines whether a space boundary or a spacing threshold will be violated by the predicted trajectory (block 610). If a space boundary or a spacing threshold will not be violated by the predicted trajectory ("No" path of block 610), the application returns to block 608.

If a space boundary or a spacing threshold will be violated by the predicted trajectory ("Yes" path of block 610), the application activates a notification informing about a risk of a collision (block 612). The application logs an entry in a collision log detailing the potential collision (block 614).

The application determines whether the predicted collision actually occurred (block 616). Some non-limiting example ways of making the determination of block 616 include measuring a force applied to a controller, a sudden stop or a pause detected in a motion trajectory, an unusual variation in the motion trajectory is detected, or an image analysis showing that a space boundary or a spacing threshold is actually breached.

If the predicted collision actually occurred ("Yes" path of block 616), the application logs an entry of the actual collision (block 618). The application applies to an account associated with the user a penalty corresponding to occurrence of the collision (block 620). The application proceeds to block 626 thereafter.

If the predicted collision does not occur ("No" path of block 616), the application logs an entry of the avoided collision (block 622). The application applies to an account associated with the user a reward corresponding to the avoidance of the collision (block 624).

The application determines if the game continues (block 626). If the game continues ("Yes" path of block 626), the application returns to block 608. If the game ends ("No" path of block 626), the application transmits all or some portion of the collision log for aggregation (block 628). The application ends process 600 thereafter.

In one embodiment, a subscriber can subscribe to the collision log. For example, a parent of a user may be interested in knowing if the user, perhaps a child, is involved in a collision. The parent in this example may subscribe to the collision log. An embodiment transmits the log entry or a portion thereof, that records the collision, to the subscriber parent.

The transmission in block 628 is not limited to the end of the game. An embodiment may also transmit all or a portion of the collision logs for aggregation during the game.

Thus, a computer implemented method, system or apparatus, and computer program product are provided in the illustrative embodiments for mitigating collisions in a physical space during gaming. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for mitigating collisions in a physical three dimensional (3D) space during gaming, the method comprising:
   mapping a set of physical objects and a user situated in the 3D space to determine a spacing between an object in the set of physical objects and the user, wherein the user moves in the 3D space to cause a motion in a virtual environment of a game;
   predicting that the user will make a motion in the 3D space during the gaming;
   computing, using a processor and a memory, for the motion in the 3D space, a motion trajectory of the user, wherein the computing uses a measurement parameter corresponding to the user stored in a user profile;
   detecting that the motion trajectory of the user violates a spacing threshold between the user and the object;
   alerting, responsive to the detecting, the user about a risk of collision between the user and the object in the 3D space;
   measuring a biometric parameter of the user to obtain a value of the biometric parameter;
   comparing the value of the biometric parameter with a normal value of the biometric parameter of the user, the normal value being stored in the user profile; and
   adjusting, as a part of the computing, the motion trajectory of the user according to an outcome of the comparing.

2. The method of claim 1, further comprising:
   determining, as an additional factor, one of (i) an ambient condition in the 3D space, and (ii) a state of the game during the gaming;
   evaluating whether the outcome of the comparing is indicative of a physiological condition of the user; and
   using, responsive to evaluating being affirmative, the additional factor in the adjusting.

3. The method of claim 1, further comprising:
   measuring a biometric parameter of the user to obtain a value of the biometric parameter;
   comparing the value of the biometric parameter with a normal value of the biometric parameter of the user, the normal value being stored in the user profile; and
   adjusting, as a part of the alerting, an advance alert period, wherein the alerting precedes an expected collision according to the risk of collision by the advance alert period.

4. The method of claim 3, further comprising
   determining, as an additional factor, one of (i) an ambient condition in the 3D space, and (ii) a state of the game during the gaming;
   evaluating whether an outcome of the comparing is indicative of a physiological condition of the user; and
   using, responsive to evaluating being affirmative, the additional factor in the adjusting.

5. The method of claim 1, further comprising:
   recording a notification entry in a collision log, the notification entry comprising information describing the motion, a state of the game during the gaming, and a user parameter.

6. The method of claim 5, further comprising:
   transmitting a portion of the notification entry to an aggregated log repository, wherein the transmitting the portion enables a modification to the game.

7. The method of claim 1, further comprising:
   determining whether an expected collision according to the risk of collision actually occurred in the 3D space;
   recording, responsive to the expected collision actually occurring, a collision entry in a collision log, the collision entry comprising information describing the motion, a state of the game during the gaming, and a user parameter; and
   applying, to an account associated with the user in the game, a penalty corresponding to the actual occurrence of the expected collision.

8. The method of claim 7, further comprising:
   sending a portion of the collision entry to a subscriber.

9. The method of claim 1, further comprising:
   determining whether an expected collision according to the risk of collision was avoided in the 3D space;
   recording, responsive to the expected collision being avoided, an avoidance entry in a collision log, the avoidance entry comprising information describing the motion, a state of the game during the gaming, and a user parameter; and
   applying, to an account associated with the user in the game, a reward corresponding to the avoided of the expected collision.

10. The method of claim 1, further comprising:
    modifying, as a part of computing the motion trajectory of the user, a motion trajectory related to the game, wherein the modifying uses the measurement parameter to adjust the motion trajectory related to the game to form the motion trajectory of the user.

11. The method of claim 1, further comprising:
    capturing, using an imaging device, an initial image of the 3D space; and
    analyzing the initial image to compute the spacing threshold.

12. The method of claim 1, further comprising:
capturing, using an imaging device, an image of the 3D space, the capturing occurring during the gaming and after a movement by the user in the 3D space; and
analyzing the image to compute the spacing, wherein the spacing forms the spacing threshold.

13. The method of claim 1, further comprising:
projecting, as a part of the alerting, an image of the 3D space into the virtual environment of the game.

14. The method of claim 1, wherein the set of physical objects comprises a second user, wherein the object is the second user, and wherein a second measurement parameter corresponding to the second user stored in a second user profile associated with the second user.

15. A non-transitory computer readable article of manufacture tangibly embodying computer readable instructions which, when executed, cause a computer to carry out steps of a method for mitigating collisions in a physical three dimensional (3D) space during gaming, the method comprising:
mapping a set of physical objects and a user situated in the 3D space to determine a spacing between an object in the set of physical objects and the user, wherein the user moves in the 3D space to cause a motion in a virtual environment of a game;
predicting that the user will make a motion in the 3D space during the gaming;
computing, using a processor and a memory, for the motion in the 3D space, a motion trajectory of the user, wherein the computing uses a measurement parameter corresponding to the user stored in a user profile;
detecting that the motion trajectory of the user violates a spacing threshold between the user and the object;
alerting, responsive to the detecting, the user about a risk of collision between the user and the object in the 3D space;
measuring a biometric parameter of the user to obtain a value of the biometric parameter;
comparing the value of the biometric parameter with a normal value of the biometric parameter of the user, the normal value being stored in the user profile; and
adjusting, as a part of the computing, the motion trajectory of the user according to an outcome of the comparing.

16. The non-transitory computer readable article of manufacture of claim 15 further embodying transferring instructions which, when executed, cause the computer to carry out the method further comprising:
transferring over a network from a remote data processing system, the computer readable instructions; and
storing, responsive to the transferring, the computer readable instructions in a data processing system.

17. The non-transitory computer readable article of manufacture of claim 15 further embodying downloading instructions which, when executed, cause the computer to carry out the method further comprising:
downloading, from a server data processing system where computer usable instructions are stored, over a network to a remote data processing system, the computer readable instructions for use in a computer readable storage device associated with the remote data processing system.

* * * * *